United States Patent Office 3,706,810
Patented Dec. 19, 1972

3,706,810
N-MORPHOLINOALKYL-THIENO[3,2-b]PYRROLE-5-CARBOXAMIDES
Herbert Joseph Brabander, Nanuet, N.Y., and William Blythe Wright, Jr., Woodcliff Lake, N.J., assignors to American Cyanamid Company, Stamford, Conn.
No Drawing. Filed Sept. 15, 1970, Ser. No. 72,524
Int. Cl. C07d 87/46
U.S. Cl. 260—247.1          5 Claims

ABSTRACT OF THE DISCLOSURE

The preparation of N-(aminoalkyl) derivatives of thieno[3,2-b]pyrrole-5-carboxamides by several methods is described. One method is reacting a thieno[3,2-b]pyrrole-5-carboxylic acid with N,N'-carbonyldiimidazole and subsequently with an alkylene diamine. The substituted thieno[3,2-b]pyrrole-5-carboxamides are useful as analgesic and anti-depressant agents.

DESCRIPTION OF THE INVENTION

This invention relates to new compounds. More particularly, it relates to novel N-(aminoalkyl) derivatives of thieno[3,2-b]pyrrole-5-carboxamide and methods of preparing the same.

The novel compounds of the present invention may be illustrated by the following formula:

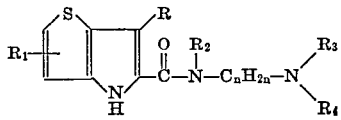

wherein R and $R_1$ are selected from the group consisting of hydrogen, methyl, bromine and chlorine; $R_2$ is selected from the group consisting of hydrogen and lower alkyl; $n$ is an integer from 2 to 5; and $R_3$ and $R_4$ are selected from the group consisting of hydrogen, lower alkyl, lower alkenyl, cycloalkyl, benzyl, phenethyl, cyclopropylmethyl, and when —$NR_3R_4$ is taken together 1-pyrrolidinyl, lower alkyl-1-pyrrolidinyl, piperidino, lower alkylpiperidino, morpholino, lower alkylmorpholino, hexamethyleneimino, 1-piperazinyl, 1-(lower alkyl)-4-piperazinyl,
1-phenyl-4-piperazinyl,
1-(lower alkoxyphenyl)-4-piperazinyl,
1-trifluoromethylphenyl-4-piperazinyl,
1-(lower alkylphenyl)-4-piperazinyl,
1-halophenyl-4-piperazinyl,
4-phenyl-$\Delta^3$-piperidino,
4-(lower alkylphenyl)-$\Delta^3$-piperidino,
4-halophenyl-$\Delta^3$-piperidino,
4-(lower alkoxyphenyl)-$\Delta^3$-piperidino,
4-trifluoromethylphenyl-$\Delta^3$-piperidino and
azabicyclo[3.2.2]nonan-3-yl; and pharmaceutically acceptable acid addition salts thereof.

The terms lower alkyl and lower alkoxy are intended to include those having 1 to 4 carbon atoms. Lower alkenyl are those with 2 to 4 carbon atoms. The term halogen includes those substituents having fluorine, chlorine and bromine present.

The free bases of the active components of this invention, in general, may be either liquids or solids at room temperature. The free bases, are in general, relatively insoluble in water, but soluble in most organic solvents such as lower alkyl alcohols, benzene, acetone, chloroform and the like. These compounds form acid addition salts with strong acids, such as hydrochloric acid, sulfur acid, perchloric acid, and the like. The compounds also form salts with organic acids, as for example, fumaric, succinic, and maleic acid. Such salts, in general, are soluble in water, methanol and ethanol, but relatively insoluble in benzene, ether, petroleum ether, and the like.

The compounds of this invention can be prepared by one of the following methods of which the first method has been found most advantageous.

First method

A reactive thieno[3,2-b]pyrrole-5-carboxamide is prepared as an intermediate followed by reaction with the alkylene diamine as the preferred process.

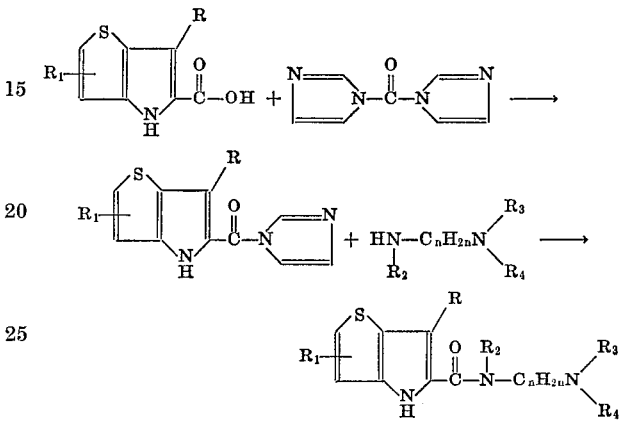

wherein R, $R_1$, $R_2$, $R_3$, $R_4$ and $n$ are as herein before defined.

This reaction is best carried out in two steps and tetrahydrofuran is a satisfactory solvent. A temperature range of 25-75° C. is most desirable.

Second method

The compounds of the present invention may also be prepared by other methods. One of these involves the preparation of a thieno[3,2-b]pyrrole-5-carbonyl chloride as an intermediate followed by reaction with an alkylene diamine:

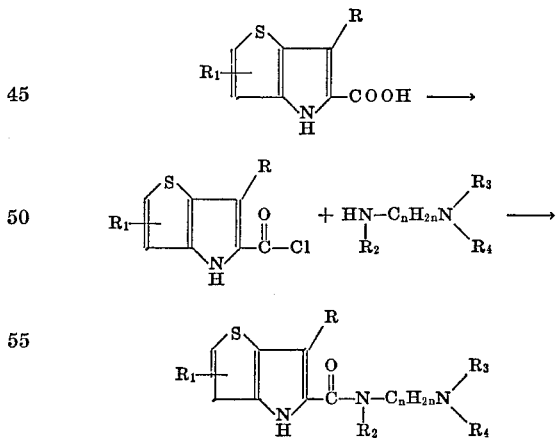

wherein R, $R_1$, $R_2$, $R_3$, $R_4$ and $n$ are as defined hereinbefore.

In this process, the carboxylic acid is reacted with a halogenating agent such as thionyl chloride in an inert solvent. The carboxylic acid chloride is isolated and reacted with an alkylene diamine derivative. The products are removed and purified by recrystallization from a suitable solvent. Alternatively, an ester or acid anhydride may be prepared as the intermediate.

Third method

In still another method, the acid and the alkylene diamine are mixed and a carbodiimide derivative is added to effect condensation. This reaction may usually be carried out

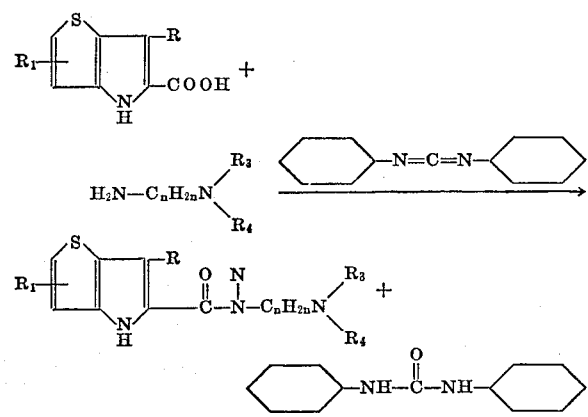

within a temperature range of 25–100° C. and the product is isolated by procedures well known to the art.

Fourth method

A still further method can be used in which thieno[3,2-b]pyrrole-5-carboxamide is used as an intermediate for alkylation procedures as follows:

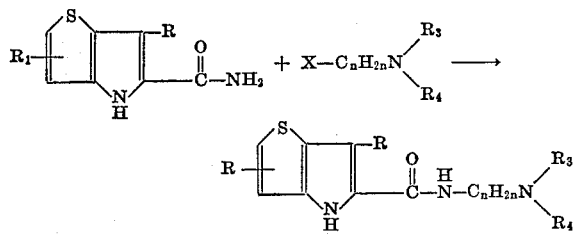

wherein R, $R_1$, $R_3$, $R_4$ and $n$ are as defined herein before and X is a reactive halogen, lower alkyl sulfonyloxy or arylsulfonyloxy group. The amide is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30–100° C. for a period of from 30 minutes to 6 hours.

Fifth method

Still another method of preparation consists of first preparing the N-(bromoalkyl)thieno[3,2-b]pyrrole-5-carboxamide and then reacting this with an amine.

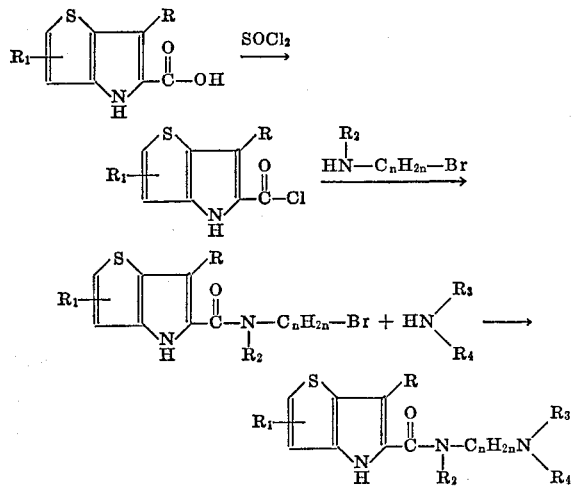

wherein R, $R_1$, $R_2$, $R_3$, $R_4$ and $n$ are as defined hereinbefore. The reaction in the last step takes place when the reagents are contacted in an inert solvent such as ethanol, tetrahydrofuran, toluene, benzene and the like and the reagent mixture is maintained within the temperature of from about 50° to 150° C. for a period of 10 minutes to several hours.

The thieno[3,2-b]pyrrole-5-carboxylic acids used as intermediates in the above methods, are prepared by standard literature procedures: R. L. Keener, F. S. Skelton and H. R. Snyder, J. Org. Chem. 33, 1355 (1968); W. W. Gale, A. N. Scott, and H. R. Snyder, J. Org. Chem. 29, 2160 (1964); C. Sone and Y. Matsuki, Nippon Kagaku Zasshi 83, 496 (1962); H. R. Snyder, L. A. Carpino, J. F. Zack, Jr., and J. F. Mills, J. Am. Chem. Soc. 79, 2556 (1957).

The compounds of this invention have been found to be active analgesics. The compounds are tested by a modification of the method described by E. Siegmund et al., Proc. Soc. Expt. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes, any compound that reduces the incidence of writhing to 18 or less is considered active in the (PPQ) test, otherwise the compound is rejected.

The compounds of the present invention have also been found to possess antidepressant activity. The anti-depressant properties are determined by measuring the ability to counteract in animals a depression induced by the administration of tetrabenazene hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. Thirty minutes later the anti-depressant treated groups are placed individually at the center of a horizontal disc about 18 inches in diameter. Within a short period of time, these individuals show normal exploratory behavior such as walking to the edge and looking over the side or other characteristic movements related to the normal tendency to explore a new environment. Individuals, treated with tetrabenazine hexamate alone or in a combination with an ineffective anti-depressant agent do not show this normal exploratory behavior, but remain at the center of the disc for a considerable period of time. The compounds of this invention show desirable anti-depressant properties by this procedure at dose levels which produce little or no untoward reactions such as ataxia or reduced spontaneous motor activity. These doses are also well below the lethal levels, thereby demonstrating a satisfactory therapeutic index of safety.

The activity of representative compounds when tested by the above procedures is summarized in the following table.

TABLE

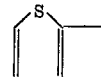

CONH—$C_nH_{2n}$—B·HCl

| n | B | Antidepressant [1] | Analgesic [2] |
|---|---|---|---|
| 2 | 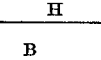 morpholino | R | A |
| 5 |  morpholino | R | A |
| 2 | 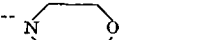 piperidino | R | A |
| 2 | 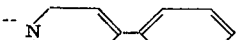 N-phenylpiperazino | 25 | A |

[1] Effective dose in mg./kg., R=rejected at 50 mg./kg.
[2] A=active at 200 mg./kg.

Compositions containing the thieno[3,2-b]pyrrole-5-carboxamides may be administered to warm-blooded animals orally, or parenterally if desired and when so administered may be considered as an agent for therapeutically desirable treatment of pain and depression in daily doses ranging from about 50 to about 1000 milligrams. The dosage regimen can be adjusted to provide optimum therapeutic response. Thus, for example, several smaller doses may be administered daily, or the dose may be reduced proportionately as indicated by the requirement of the particular therapeutic situation.

For therapeutic administration the active compounds of this invention may be incorporated with pharmaceutical carriers such as excipients and used, for example, in the form of tablets, dragees, capsules, suppositories, liquids, elixirs, emulsions, suspensions, syrups, chocolate, candy wafers, chewing gum, or the like. Such compositions and preparations should contain at least 0.1% of active component. The percentage in the compositions and preparations, may, of course, be varied, and may conveniently be between 2% and 60% of more of the weight of the unit. The amount of compound in such therapeutically useful compositions or preparations is such that a suitable dosage will be obtained. The daily dosage may vary from 2 to 50 mg./kg. Preferred compositions or preparations according to the present invention are prepared so that a dosage unit form contains between about 10 and about 250 milligrams of the active compound. Obviously, in addition to the therapeutic compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE 1

Preparation of N-(2-morpholinoethyl)-4H-thieno[3,2-b]pyrrole-5-carboxamide

A mixture of 1 part of 4H-thieno[3,2-b]pyrrole-5-carboxylic acid, 1 part of N,N'-carbonyldiimidazole and 50 parts of dry tetrahydrofuran is allowed to stand at room temperature for 2 hours and 1 part of 2-morpholinoethylamine is then added. After 16 hours, the solvent is distilled off and the residue is made alkaline with dilute sodium hydroxide and extracted into benzene. The benzene layer is washed with water and concentrated to a tan crystalline residue which is triturated in ether and filtered off. N - (2-morpholinoethyl)-4H-thieno[3,2-b]pyrrole-5-carboxamide melts at 177–179° C. The hydrochloride salt melts at 255–257° C.

EXAMPLE 2

Preparation of N-(5-morpholinopentyl)-4H-thieno[3,2-b]pyrrole-5-carboxamide

The above compound, melting point 176–178° C., is obtained when 4H-thieno[3,2-b]pyrrole-5-carboxylic acid is treated with N,N'-carbonyldiimidazole and 5-morpholinopentylamine by the procedure of Example 1. The hydrochloride salt melts at 253–256° C.

EXAMPLE 3

Preparation of N-(3-aminopropyl)-6-methyl-4H-thieno[3,2-b]pyrrole-5-carboxamide

When 6 - methyl-4H-thieno[3,2-b]pyrrole-5-carboxylic acid, N,N'-carbonyldiimidazole, and propylene diamine are reacted together following the procedure of Example 1, the above compound is obtained.

EXAMPLE 4

Preparation of N-(2-dimethylaminoethyl)-4H-thieno[3,2-b]pyrrole-5-carboxamide

The above compound is obtained when 4H-thieno[3,2-b]pyrrole-5-carboxylic acid is treated with N,N'-carbonyldiimidazole and N,N-dimethylethylene diamine using the procedure of Example 1.

EXAMPLE 5

Preparation of N-(4-allylmethylaminobutyl)-2,6-dibromo-4H-thieno[3,2-b]pyrrole-5-carboxamide This compound is obtained when 2,6 - dibromo - 4H-thieno[3,2-b]pyrrole-5-carboxylic acid and N,N'-carbonyldiimidazole are contacted with N-allyl-N-methyl butylenediamine following the procedure of Example 1.

EXAMPLE 6

Preparation of N-[2-(cyclopropyl)methylaminoethyl]-3-methyl-4H-thieno[3,2-b]pyrrole-5-carboxamide When 3 - methyl-4H-thieno[3,2-b]pyrrole-5-carboxylic acid and N,N'-carbonyldiimidazole are reacted with N-cyclopropyl-N-methylethylenediamine using the procedure of Example 1, this compound is obtained.

EXAMPLE 7

Preparation of N-(3-ethylphenethylaminopropyl)-N-methyl-4H-thieno[3,2-b]pyrrole-5-carboxamide If N-ethyl-N'-methyl-N-phenethyl propylenediamine is substituted for 2-morpholinoethylamine in the procedure of Example 1, the above compound is obtained.

EXAMPLE 8

Preparation of N-(2-benzylmethylaminoethyl)-4H-thieno[3,2-b]pyrrole-5-carboxamide The above compound is obtained if N-benzyl-N-methyl ethylenediamine is substituted for 2-morpholinoethylamine in the procedure of Example 1.

EXAMPLE 9

Preparation of N-(2-methylaminoethyl)-4H-thieno[3,2-b]pyrrole-5-carboxamide

A mixture of 3.0 parts of N-(2-benzylmethylaminoethyl)-4H-thieno[3,2-b]pyrrole-5-carboxamide, 100 parts of 90% ethanol, 3.0 equivalents of 2 N ethanolic hydrogen chloride and 1 part of 10% palladium-on-carbon catalyst is shaken in a Parr hydrogenator under a hydrogen pressure of about 3 atmospheres until reduction is complete. The catalyst is filtered off and the mother liquor is concentrated. The residue is treated with dilute sodium hydroxide and extracted with benzene to remove the desired product. The benzene layer is concentrated to obtain N-(2-methylaminoethyl) - 4H - thieno[3,2-b]pyrrole-5-carboxamide.

EXAMPLE 10

Preparation of N - [2-(cyclopropylmethyl)methylamino]ethyl-2,6-dichloro - 4H - thieno[3,2-b]pyrrole - 5 - carboxamide When 2,6-dichloro - 4H - thieno[3,2-b]pyrrole - 5 - carboxylic acid, N,N'-carbonyldiimidazole and N-cyclopropylmethyl - N - methyl ethylenediamine are reacted together by the procedure of Example 1, the above compound is obtained.

EXAMPLE 11

Preparation of N-[2-(1-pyrrolidinyl)ethyl]-4H-thieno[3,2-b]pyrrole-5-carboxamide This compound is obtained when 2-(1-pyrrolidinyl)ethylamine is substituted for 2-morpholinoethylamine in the procedure of Example 1.

EXAMPLE 12

Preparation of N-[3-(2-methyl-1-pyrrolidinyl)propyl]-2,6-dibromo-4H-thieno[3,2-b]pyrrole-5-carboxamide The above compound is obtained when 2,6-dibromo-4H-thieno[3,2-b]pyrrole-5-carboxylic acid and N,N'-carbonyldiimidazole are reacted with 3-(2-methyl-1-pyrrolidinyl)propylamine using the procedure of Example 1.

EXAMPLE 13

Preparation of N-(2-piperidinopropyl)-N-propyl-4H-thieno[3,2-b]pyrrole-5-carboxamide This compound is obtained when N-(2-piperidinopropyl)-N-propylamine is substituted for 2-morpholinoethylamine in the procedure of Example 1.

EXAMPLE 14

Preparation of N-[4-(2-methyl)piperidinobutyl]-6-methyl-4H-thieno[3,2-b]pyrrole-5-carboxamide When 6-methyl-4H-thieno[3,2-b]pyrrole-5-carboxylic acid, N,N'-carbonyldiimidazole are reacted with N-[4-(2-methyl)piperidino]butylamine by the procedure of Example 1, the above compound is obtained.

EXAMPLE 15

Preparation of N-(3-morpholinopropyl)-4H-thieno[3,2-b]pyrrole-5-carboxamide

The above compound is obtained when 3-morpholinopropylamine is substituted for 2-morpholinoethylamine in the procedure of Example 1.

EXAMPLE 16

Preparation of N-methyl-N-[2-(2-methyl)morpholinoethyl]-2,6-dichloro-4H-thieno[3,2-b]pyrrole-5-carboxamide When 2,6-dichloro-4H-thieno[3,2-b]pyrrole-5-carboxylic acid, N,N'-carbonyldiimidazole and N-methyl-N-[2-(2-methyl)morpholinoethyl]amine are contacted together using the procedure of Example 1, this compound is obtained.

EXAMPLE 17

Preparation of N-(3-hexamethyleneiminopropyl)-4H-thieno[3,2-b]pyrrole-5-carboxamide The above compound is obtained when 3-hexamethyleneiminopropylamine is substituted for 2-morpholinoethylamine using the procedure of Example 1.

EXAMPLE 18

Preparation of N-[2-(4-phenyl-1-piperazinyl)ethyl]-4H-thieno[3,2-b]pyrrole-5-carboxamide When 1-(2-aminoethyl)-4-phenylpiperazine is substituted for 2-morpholinoethylamine in the procedure of Example 1, the above compound is obtained, melting point 214–216° C. The hydrochloride salt melts at 269–272° C.

EXAMPLE 19

Preparation of N-[3-(4-benzyl-1-piperazinyl)propyl]-N-ethyl-4H-thieno[3,2-b]pyrrole-5-carboxamide When 2-morpholinoethylamine is substituted by N-[3-(4-benzyl-1-piperazinyl)propyl]-N-ethylamine in the procedure of Example 1, the above compound is obtained.

EXAMPLE 20

Preparation of N-ethyl-N-[3(1-piperazinyl)propyl]-4H-thieno[3,2-b]pyrrole-5-carboxamide This compound is obtained when N-(2-benzylmethylaminoethyl)-4H-thieno[3,2-b]pyrrole-5-carboxamide is substituted by N-[3-(4-benzyl-1-piperazinyl)propyl]-N-ethyl-4H-thieno[3,2-b]pyrrole-5-carboxamide in the procedure of Example 9.

EXAMPLE 21

Preparation of N-[2-(4-methyl-1-piperazinyl)ethyl]-4H-thieno[3,2-b]pyrrole-5-carboxamide If 1-(2-aminoethyl)-4-methylpiperazine is substituted for 2-morpholinoethylamine in the procedure of Example 1, the above compound is obtained.

EXAMPLE 22

Preparation of N-[2-(4-p-methoxyphenyl-1-piperazinyl)propyl]-6-methyl-4H-thieno[3,2-b]pyrrole-5-carboxamide When 6-methyl-4H-thieno[3,2-b]pyrrole-5-carboxylic acid, N,N'-carbonyldiimidazole and 1-(2-amino-1-methyl)ethyl-4-p-methoxyphenylpiperazine are reacted together in the procedure of Example 1, the above compound is obtained.

EXAMPLE 23

Preparation of N-[2-(4-m-trifluoromethylphenyl-1-piperazinyl)ethyl]-2,6-dibromo-4H-thieno[3,2-b]pyrrole-5-carboxamide This compound is obtained when 2,6-dibromo-4H-thieno[3,2-b]pyrrole-5-carboxylic acid, N,N'-carbonyldiimidazole and 1-(2-aminoethyl)-4-m-trifluoromethylphenylpiperazine are contacted together in the procedure of Example 1.

EXAMPLE 24

Preparation of N-[3-(4-o-tolyl-1-piperazinyl)propyl]-4H-thieno[3,2-b]pyrrole-5-carboxamide If 1-(3-aminopropyl)-4-o-tolylpiperazine is substituted for 2-morpholinoethylamine in the procedure of Example 1, the above compound is obtained.

EXAMPLE 25

Preparation of N-[2-(4-p-chlorophenyl-1-piperazinyl)ethyl]-2,6-dichloro-4H-thieno[3,2-b]pyrrole-5-carboxamide The above compound is obtained when 2,6-dichloro-4H-thieno[3,2-b]pyrrole-5-carboxylic acid and N,N'-carbonyldiimidazole are reacted with 1-(2-aminoethyl)-4-p-chlorophenylpiperazine in the procedure of Example 1.

EXAMPLE 26

Preparation of N-[3-(4-phenyl-$\Delta^3$-piperidino)propyl]-4H-thieno[3,2-b]pyrrole5-carboxamide When 4H-thieno[3,2-b]pyrrole-5-carboxylic acid is treated with N,N'-carbonyldiimidazole and 1-(3-aminopropyl)-4-phenyl-$\Delta^3$-piperidine by the procedure of Example 1, the above compound, melting point 239–241° C., is obtained. The hydrochloride salt melts at 216–218.5° C.

EXAMPLE 27

Preparation of N-[2-(4-phenyl-$\Delta^3$-piperidino)ethyl]-4H-thieno[3,2-b]pyrrole-5-carboxamide This compound, melting point 181–184° C., is obtained when 1-(2-aminoethyl)-4-phenyl-$\Delta^3$-piperidine is substituted for 2-morpholinoethylamine in the procedure of Example 1. The hydrochloride salt melts at 269–272° C.

EXAMPLE 28

Preparation of N-[5-(4-p-tolyl-$\Delta^3$-piperidino)pentyl]-4H-thieno[3,2-b]pyrrole-5-carboxamide When 1-(5-aminopentyl)-4-p-tolyl-$\Delta^3$-piperidine is substituted for 2-morpholinoethylamine in the procedure of Example 1, the above compound is obtained.

EXAMPLE 29

Preparation of N-[3-(4-p-chlorophenyl-Δ³-piperidino)propyl]-N-methyl-4H-thieno[3,2-b]pyrrole - 5 - carboxamide The above compound is obtained when 1-(3-methylaminopropyl)-4-p-chlorophenyl-Δ³-piperidine is substituted for 2-morpholinoethylamine in the procedure of Example 1.

EXAMPLE 30

Preparation of N-[2-(4-m-methoxyphenyl-Δ³-piperidino)ethyl]-2,6-dibromo-4H-thieno[3,2-b]pyrrole - 5 - carboxamide This compound is obtained when 2,6-dibromo-4H-thieno[3,2-b]pyrrole-5-carboxylic acid and N,N'-carbonyldiimidazole are reacted with 1-(2-aminoethyl)-4-m-methoxyphenyl-Δ³-piperidine in the procedure of Example 1.

EXAMPLE 31

Preparation of N-[3-(4-p-trifluoromethylphenyl-Δ³-piperidino)propyl]-6-methyl - 4H - thieno[3,2-b]pyrrole-5-carboxamide When 6-methyl-4H-thieno[3,2-b]pyrrole-5-carboxylic acid and N,N'-carbonyldiimidazole are contacted with 1-(3-aminopropyl)4-p-trifluoromethylphenyl - Δ³ - piperidine, the above compound is obtained by the procedure of Example 1.

EXAMPLE 32

Preparation of N-[2-(azabicyclo[3.2.2]nonan - 3 - yl)ethyl]-4H-thieno[3,2-b]pyrrole-5-carboxamide The above compound is obtained when 1-[2-(azabicyclo[3.2.2]nonan-3-yl)ethyl]amine is substituted for 2-morpholinoethylamine in the procedure of Example 1.

EXAMPLE 33

Preparation of N-[3-(cyclohexyl)ethylaminopropyl]-4H-thieno[3,2-b]pyrrole-5-carboxamide The above compound is obtained when N-cyclohexyl-N-ethyl ethylenediamine is substituted for 2-morpholinoethylamine in the procedure of Example 1.

EXAMPLE 34

Preparation of N-[2-(4-m-bromophenyl-1-piperazinyl)ethyl]-6-methyl - 4H - thieno[3,2-b]pyrrole-5-carboxamide If 1-(2-aminoethyl)-4-m-bromophenylpiperazine is substituted for 2-morpholinoethylamine in the procedure of Example 1, the above compound is obtained.

EXAMPLE 35

Preparation of N-[3-(4-o-fluorophenyl-1-piperazinyl)propyl]-4H-thieno-[3,2-b]pyrrole-5-carboxamide When 4H-thieno[3,2-b]pyrrole-5-carboxylic acid,N,N'-carbonyldiimidazole and 1-(3-aminopropyl)-4-o-fluorophenylpiperazine are contacted together in the procedure of Example 1, the above compound is obtained.

EXAMPLE 36

Preparation of N-[4-(4-m-bromophenyl-Δ³-piperidino)butyl]-2,6-dichloro - 4H - thieno[3,2-b]pyrrole-5-carboxamide This compound is obtained when 1-(4-aminobutyl)-4-m-bromophenyl-Δ3-piperidine is substituted for 2-morpholinoethylamine in the procedure of Example 1.

EXAMPLE 37

Preparation of N-[2-(4-o-fluorophenyl-Δ³-piperidino)ethyl]-4H-thieno[3,2-b]pyrrole-5-carboxamide The above compound is obtained when 4H-thieno[3,2-b]pyrrole-5-carboxylic acid and N,N-carbonyldiimidazole are reacted with 1-(2-aminoethyl)-4-o-fluorophenyl-Δ³-piperidine in the procedure of Example 1.

We claim:

1. A thieno[3,2-b]pyrrole-5-carboxamide in accordance with claim 1, having the formula:

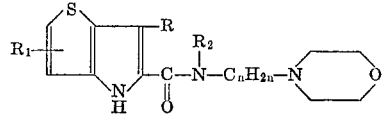

wherein R and $R_1$ are selected from the group consisting of hydrogen, methyl, bromine and chlorine; $R_2$ is selected from the group consisting of hydrogen and lower alkyl; $n$ is an integer from 2 to 5 and pharmaceutically acceptable acid addition salts thereof.

2. A thieno[3,2-b]pyrrole-5-carboxamide in accordance with claim 1, having the formula:

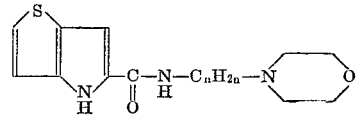

wherein $n$ is an integer from 2 to 5.

3. The thieno[3,2-b]pyrrole-5-carboxamide in accordance with claim 1, N-(2-morpholinoethyl)-4H-thieno[3,2-b]pyrrole-5-carboxamide.

4. The thieno[3,2-b]pyrrole-5-carboxamide in accordance with claim 1, N-(5-morpholinopentyl)-4H-thieno[3,2-b]pyrrole-5-carboxamide.

5. The thieno[3,2-b]pyrrole-5-carboxamide in accordance with claim 1, N-(3-morpholinopropyl)4H-thieno[3,2-b]pyrrole-5-carboxamide.

No references cited.

ALEX MAZEL, Primary Examiner

J. TOVAR, Assistant Examiner

U.S. Cl. X.R.

260—268 BC, 293.57, 294.8, 326.3; 424—248